(No Model.)  2 Sheets—Sheet 1.
J. H. IRWIN.
Telephone.
No. 233,251.  Patented Oct. 12, 1880.
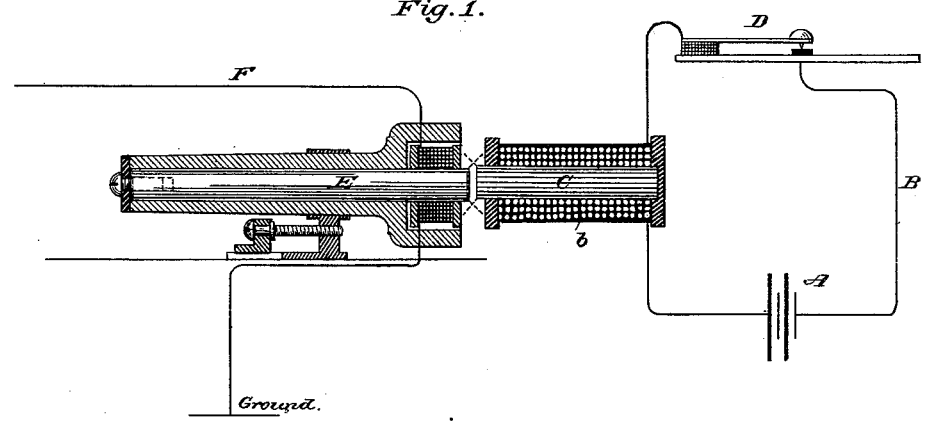
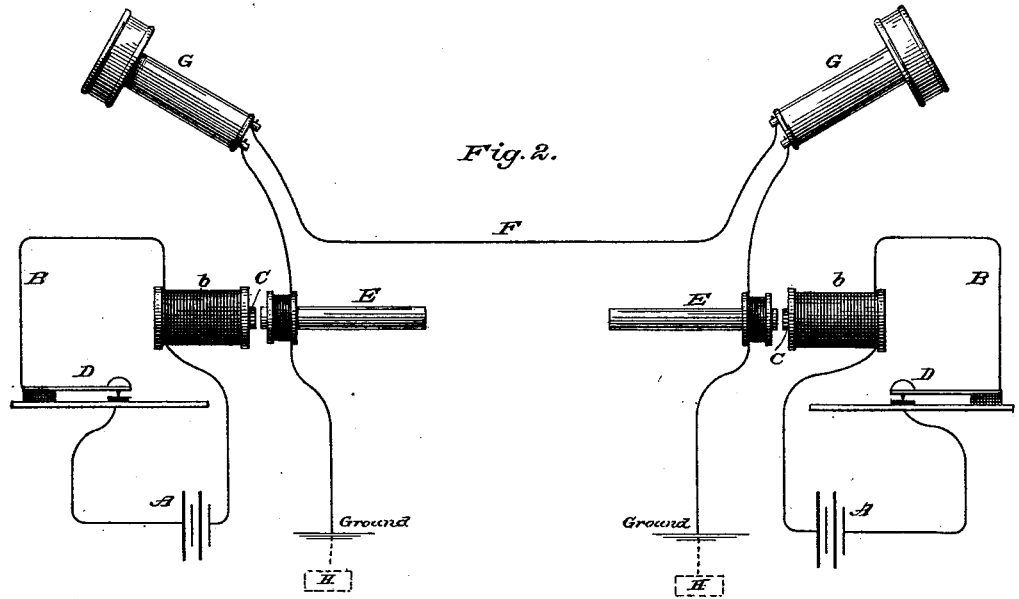
Attest:
A. B. Smith
L. H. Marshall
Inventor:
John H. Irwin
By his atty.
R. D. O. Smith (No Model.) 2 Sheets—Sheet 2.

J. H. IRWIN.
Telephone.

No. 233,251. Patented Oct. 12, 1880.

Attest:
A. B. Smith
L. H. Marshall

Inventor:
John H. Irwin

UNITED STATES PATENT OFFICE.

JOHN H. IRWIN, OF MORTON, PENNSYLVANIA.

TELEPHONE.

SPECIFICATION forming part of Letters Patent No. 233,251, dated October 12, 1880.

Application filed April 24, 1880. (No model.)

*To all whom it may concern:*

Be it known that I, JOHN H. IRWIN, of Morton, in the county of Delaware and State of Pennsylvania, have invented a new and useful Improvement in Telephones, of which the following is a full and exact description.

Heretofore transmitting-instruments have belonged to three general classes: first, those which operate the line through induction caused by the disturbance of permanent magnetism by a vibrating armature; second, those which operate through the varying resistance of a battery-current of some point in a short circuit; and, third, those which operate the line by induction caused by varying the resistance in the primary of an ordinary Page inducting-coil placed in short circuit with a battery.

In this improvement the line is operated by disturbing the magnetism of one magnet by varying the magnetic activity of another magnet in the magnetic field. The line-current may be induced by disturbance of the magnetism of a permanent magnet or by undulating a battery-current by disturbing the magnetism of an electro-magnet contiguous to said current. By these means the following new results are attained: First, the use of the ordinary induction-coil as a factor is dispensed with; second, the magnetic disturbance in the transmitting-magnet is rendered much greater and more effective than heretofore; third, the instrument may, by the interposition of a diaphragm, be effective as a receiver, the currents then being received by the direct magnet as a primary without passing through and encountering the resistance of the ordinary induction-coil.

That others may fully understand my invention, I will particularly describe a practical form of it, without, however, limiting myself to the exact details of structure shown, because they may be greatly varied without departing from the spirit of my invention or materially changing the results attained.

Figure 3:
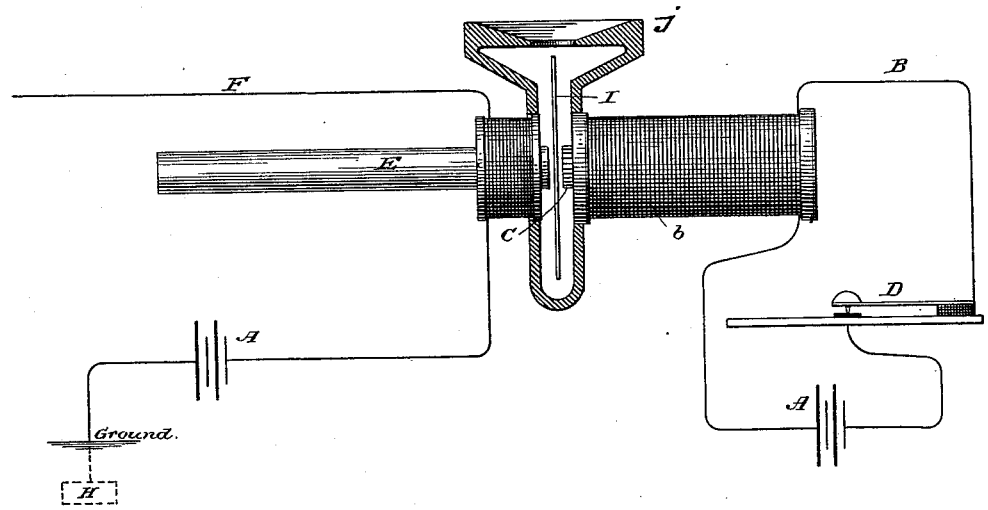
Figure 4:
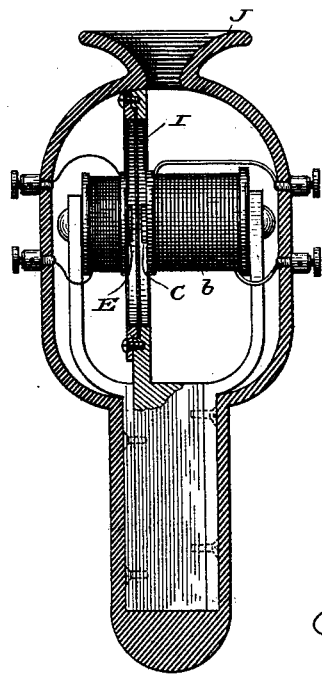

Reference is had to the accompanying drawings, wherein Figure 1 represents a typical form of my invention. Fig. 2 is a diagram representing the same developed in a working system. Fig. 3 represents my invention arranged as a receiver. Fig. 4 is a modified form of the same.

A is the battery. B is the short-circuit wire. C is the soft-iron core, which, when inclosed in the coils $b$ of the wire B, becomes an electro-magnet whenever the circuit in B is closed. D is a transmitting-instrument of any approved and proper description. E is another magnet, placed in relation to the magnet C so that their poles are in the same magnetic field, as shown by diverging dotted lines from each. The magnetism of the magnet E may be due to permanent magnetization of hard steel or to electro-magnetism derived from the passage of a battery-current in its vicinity.

F is the line-wire leading to another station. The electric current in the line-wire may be an induced current generated by disturbance of permanent magnetism in the core E, or it may be a battery-current, as shown in Fig. 3.

The magnetism in E will be disturbed by any disturbance of the magnetism in C, and a molecular undulation in the current in the line F will be set up by and in exact accordance with such disturbance.

My invention substitutes a possible magnetic disturbance in another magnet for the induction disturbance of a moving armature, and thereby the magnetic disturbance in the transmitting-magnet E may be strengthened to any desirable extent. The undulation of the electric current in the line F will be in accordance with the magnetic disturbance in the magnet E, whatever may be the source of said current.

In Fig. 2 my invention is represented as it is developed in a practical system.

G G are ordinary permanent magnet receivers, which may be placed in the line as usual. Of course I do not propose to limit myself to the use of receivers of this particular description. I only show such because they are well known and effective instruments. If a battery-current is employed in the line F, then electro-magnet receivers may be employed at G.

H H are the usual ground-connections.

In Fig. 3 I represent my instrument provided with a reverberator or diaphragm, I, placed in the magnetic field between the poles of the magnets C and E and transverse to the axes of said magnets. An inclosing-case, J, with an aural opening, may also be added, and the receiver at G may then be omitted. With the instrument constructed in this way the electric undulations coming over the line F will act upon and disturb the magnetism of the magnet E direct, and with the well-known audible effect, and said received undulations will not be affected by resistance in the induction-coil, as always heretofore, for it will be observed that by this structure and mode of arrangement there is no induction apparatus whatever in the line of received electric undulations, and the helix of the magnet E is brought close to said magnet, and the current acts thereon directly as a primary current; thereby in effect that part of the apparatus which may (or may not) be inductive, considered as a transmitter, becomes direct-acting, considered as a receiver.

In Fig. 4 the instrument is shown in a portable and convenient form for ordinary use, being mounted on a suitable handle; but otherwise it does not differ from that shown in Fig. 3.

Having now described my invention, what I claim as new is—

1. A telephone-transmitter in short circuit with an independent battery and electro-magnet, combined with a transmitting-magnet the magnetism whereof is disturbed by variation of magnetism in said electro-magnet.

2. The electro-magnet C, in short circuit with a battery and proper transmitting-instrument, combined with a magnet, E, the poles of said magnets being fixed in the same magnetic field, and a line-wire, F.

3. The transmitters D D, in short circuits with their respective batteries and electro-magnets C C, combined with the magnets E E, set in the same magnetic fields with said magnets C C, the line-wire F, and receivers G G, to constitute an effective system to connect two telephone-stations.

4. The transmitter D, in short circuit with the battery A and electro-magnet C, combined with the magnet E in the same magnetic field, and the interposed diaphragm I, for the purpose stated.

5. The electro-magnet C, in short circuit with the transmitter, the independent magnet E, and interposed diaphragm I, combined with an inclosing case, J, provided with an aural opening and a handle.

J. H. IRWIN.

Witnesses:
R. D. O. SMITH,
KINGSTON GODDARD.